(12) United States Patent
Perreault et al.

(10) Patent No.: US 12,412,168 B2
(45) Date of Patent: Sep. 9, 2025

(54) METHOD AND SYSTEM FOR GENERATING CUSTOMIZED ELECTRONIC CHECKOUT USER INTERFACES

(71) Applicant: Shopify Inc., Ottawa (CA)

(72) Inventors: Mathieu Perreault, Mont Royal (CA); Louis McCracken, Annandale, VA (US); Richard Btaiche, Montreal (CA); Mathias Boutin, Montreal (CA); Manuel Darveau, Montreal (CA); Louise Heng, Montreal (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/175,032

(22) Filed: Feb. 12, 2021

(65) Prior Publication Data

US 2022/0261788 A1   Aug. 18, 2022

(51) Int. Cl.
*G06Q 20/36* (2012.01)
*G06Q 20/12* (2012.01)
*G06Q 20/40* (2012.01)

(52) U.S. Cl.
CPC ............. *G06Q 20/36* (2013.01); *G06Q 20/12* (2013.01); *G06Q 20/40* (2013.01)

(58) Field of Classification Search
CPC ...................................................... G06Q 20/36
See application file for complete search history.

(56) References Cited

U.S. PATENT DOCUMENTS

| | | | | |
|---|---|---|---|---|
| 2003/0217892 | A1* | 11/2003 | Persky | G07G 1/0054 186/68 |
| 2008/0162318 | A1* | 7/2008 | Butler | G06Q 20/325 705/65 |
| 2010/0083171 | A1* | 4/2010 | Begue | G06Q 30/06 715/810 |
| 2013/0211964 | A1* | 8/2013 | Hampton | G06Q 30/0641 705/26.61 |
| 2013/0232037 | A1* | 9/2013 | Edwards | G06Q 30/0641 705/27.1 |
| 2013/0254115 | A1 | 9/2013 | Pasa et al. | |
| 2014/0200953 | A1* | 7/2014 | Mun | G06Q 10/04 705/7.28 |

(Continued)

OTHER PUBLICATIONS

Extended European Search Report, EP Application No. 21192784.3, issued Feb. 14, 2022.

(Continued)

*Primary Examiner* — Calvin L Hewitt, II
*Assistant Examiner* — Kevin T Poe
(74) *Attorney, Agent, or Firm* — Foley & Lardner LLP

(57) ABSTRACT

A method for completing a checkout operation, the method including determining a set of required checkout information elements based on a checkout configuration for the checkout operation; determining a set of checkout information elements available at an online store; identifying missing checkout information elements from the set of required checkout information elements when compared with the set of information elements available at the online store; and transmitting instructions for rendering a checkout user interface at a computing device, the checkout user interface being configured to receive the missing checkout information elements from a user to complete the checkout operation.

18 Claims, 8 Drawing Sheets

(56) References Cited

U.S. PATENT DOCUMENTS

| | | | |
|---|---|---|---|
| 2014/0249999 A1* | 9/2014 | Johnson | G06Q 20/20 |
| | | | 705/39 |
| 2015/0012431 A1* | 1/2015 | Gomez De Sebastian | |
| | | | G06Q 20/12 |
| | | | 705/44 |
| 2017/0126627 A1* | 5/2017 | Yang | H04L 63/20 |
| 2017/0228711 A1* | 8/2017 | Chawla | G06Q 20/384 |
| 2017/0249592 A1* | 8/2017 | Rossi | G06F 40/174 |
| 2017/0278174 A1 | 9/2017 | Harrell | |
| 2017/0286389 A1* | 10/2017 | Ceneviva | G06F 40/106 |
| 2017/0323395 A1* | 11/2017 | Guzman | G06Q 10/063 |
| 2018/0018312 A1* | 1/2018 | Guzman | G06V 30/412 |
| 2018/0046663 A1* | 2/2018 | Guzman | G06F 16/2365 |
| 2018/0075427 A1* | 3/2018 | Greenberger | G06Q 20/389 |
| 2018/0188934 A1* | 7/2018 | Andrizzi | G06F 3/04842 |
| 2019/0129931 A1* | 5/2019 | Hegde | G06F 16/93 |
| 2021/0201380 A1* | 7/2021 | Belcher | G06Q 30/0631 |

OTHER PUBLICATIONS

Canadian Intellectual Property Office (CIPO) Official Action for Application No. 3,140,890 dated Dec. 21, 2023, 5 pages.
European Patent Office Examiner's Report on EP Application 21 192 784.3-1218 dated Apr. 16, 2024 (8 pages).
CA Office Action for Application No. 3140890 mailing date Apr. 15, 2025, 4 pages.

* cited by examiner

Add Product / Service

Title:

Description:

Media: +

Pricing:

Inventory: SKU / Barcode

Quantity Available: 0

Checkout Category: 510

| Standard | 512 |
| Tip option |
| No tax |
| Custom | 514 |

Save

METHOD AND SYSTEM FOR GENERATING CUSTOMIZED ELECTRONIC CHECKOUT USER INTERFACES

FIELD OF THE DISCLOSURE

The present disclosure relates to electronic transactions, and in particular relates to generating user interfaces for use related to electronic commerce transactions.

BACKGROUND

Online store checkout systems have increased in complexity over time to accommodate the wide variety of commerce transactions that are possible. For example, tipping, tax ID collection, delivery options/pricing/instructions, subscriptions, gift message/wrapping options, buyer installments, and many other advanced features are all commerce concepts that need to be understood by a checkout mechanism to support the sophisticated commerce use cases that merchants need in their online stores. Further to these known commerce concepts, certain merchants have specific one-off customizations or configurations within checkout that are critical for their own purpose but are not necessarily shared by any (or many) other merchant(s). For example, asking for emergency veterinarian contact info when booking a doggy daycare or dog boarding service.

SUMMARY

The use of complex forms during checkout however may reduce efficiency and/or lead to user frustration. In particular, complex forms may require significant computer resources to obtain the information, check the information is provided correctly, and significant communications may be needed between a customer's computing device and network elements to obtain missing information or by obtaining duplicate information.

The use of digital wallets may assist with certain transactions. In particular, many digital wallets will store information such as customer shipping address, customer billing address, credit card information, among such data. The use of such information may increase the efficiency of transaction processing. For example, the consumption of computing resources (e.g., memory) for collection of such information via a user interface may be avoided and/or lessened. However, during a transaction, some information needed by checkout operations on a merchant's computing system may not be stored in such digital wallet. This can lead to a scenario where the user is forced to go through the wallet to complete the transaction and then repeat entering the information on the merchant's store checkout page, leading to a further reduction in efficiency at odds with desired efficiency increases. Indeed, in such cases the resources employed for accessing the electronic wallet and then collecting the redundant information may again exceed those as would have been consumed by merely avoiding use of the electronic wallet. In a further scenario, once a checkout operation goes to a wallet to complete a transaction, the user may never return to the merchant's computing system, leaving the merchant without needed information.

The subject-matter of the present application relates to embodiments in which a checkout operation may be simplified for a user or customer of an online or electronic store while providing information needed by a merchant checkout operation.

In one aspect, a method for completing a checkout operation may be provided, the method comprising: determining a set of required checkout information elements based on a checkout configuration for the checkout operation; determining a set of checkout information elements available at an online store; identifying missing checkout information elements from the set of required checkout information elements when compared with the set of information elements available at the online store; and transmitting instructions for rendering a checkout user interface at a computing device, the checkout user interface being configured to receive the missing checkout information elements from a user to complete the checkout operation.

In some embodiments, the determining the set of checkout information available may include receiving information elements from a service identified in the checkout configuration.

In some embodiments, the service may include at least one of: an application configured; a digital wallet service; a payment processor service; a customer profile repository; a capability library associated with the digital wallet service.

In some embodiments the determining the set of checkout information available may include a query of an electronic wallet service.

In some embodiments, the set of required information elements may be based on a product or service of the checkout operation.

In some embodiments, the checkout configuration may be based on a merchant configuration for checkouts with the online store.

In some embodiments, the checkout configuration may include a service configured for checkouts at the online store.

In some embodiments, the instructions may be configured for rendering the checkout user interface based on the missing checkout information elements.

In some embodiments, the instructions may be configured for rendering a first checkout user interface for a first set of missing checkout information elements and at least one further checkout user interface for at least one further set of missing checkout information elements.

In some embodiments, the instructions may be configured for rendering the checkout user interface and fill in available checkout information and highlight missing checkout information.

In a further aspect, a network element configured for completing a checkout operation may be provided, the network element comprising: a processor; and a communications subsystem, wherein the network element may be configured to: determine a set of required checkout information elements based on a checkout configuration for the checkout operation; determine a set of checkout information elements available at an online store; identify missing checkout information elements from the set of required checkout information elements when compared with the set of information elements available at the online store; and transmit instructions for rendering a checkout user interface at a computing device, the checkout user interface being configured to receive the missing checkout information elements from a user to complete the checkout operation.

In one embodiment, the network element may be configured to determine the set of checkout information available by receiving information elements from a service identified in the checkout configuration.

In one embodiment, the service may include at least one of: an application configured; a digital wallet service; a payment processor service; a customer profile repository; a capability library associated with the digital wallet service.

In one embodiment, wherein the network element may be configured to determine the set of checkout information available using a query of an electronic wallet service.

In one embodiment, the set of required information elements may be based on a product or service of the checkout operation.

In one embodiment, the checkout configuration may be based on a merchant configuration for checkouts with the online store.

In one embodiment, the checkout configuration may include a service configured for checkouts at the online store.

In one embodiment, the instructions may be configured for rendering the checkout user interface based on the missing checkout information elements.

In one embodiment, the instructions may be configured for rendering a first checkout user interface for a first set of missing checkout information elements and at least one further checkout user interface for at least one further set of missing checkout information elements.

In one embodiment, the instructions may be configured to render the checkout user interface and fill in available checkout information and highlight missing checkout information.

In a further aspect, a non-transitory computer readable medium for storing instruction code may be provided, which, when executed by a processor of a network element configured for completing a checkout operation may cause the network element to: determine a set of required checkout information elements based on a checkout configuration for the checkout operation; determine a set of checkout information elements available at an online store; identify missing checkout information elements from the set of required checkout information elements when compared with the set of information elements available at the online store; and transmit instructions for rendering a checkout user interface at a computing device, the checkout user interface being configured to receive the missing checkout information elements from a user to complete the checkout operation.

BRIEF DESCRIPTION OF THE DRAWINGS

The present disclosure will be better understood with reference to the drawings, in which:

FIG. 5 is an example user interface with a checkout category field added to allow customization of the checkout for a good or service being added to an on-line store;

DETAILED DESCRIPTION

Figure 1:
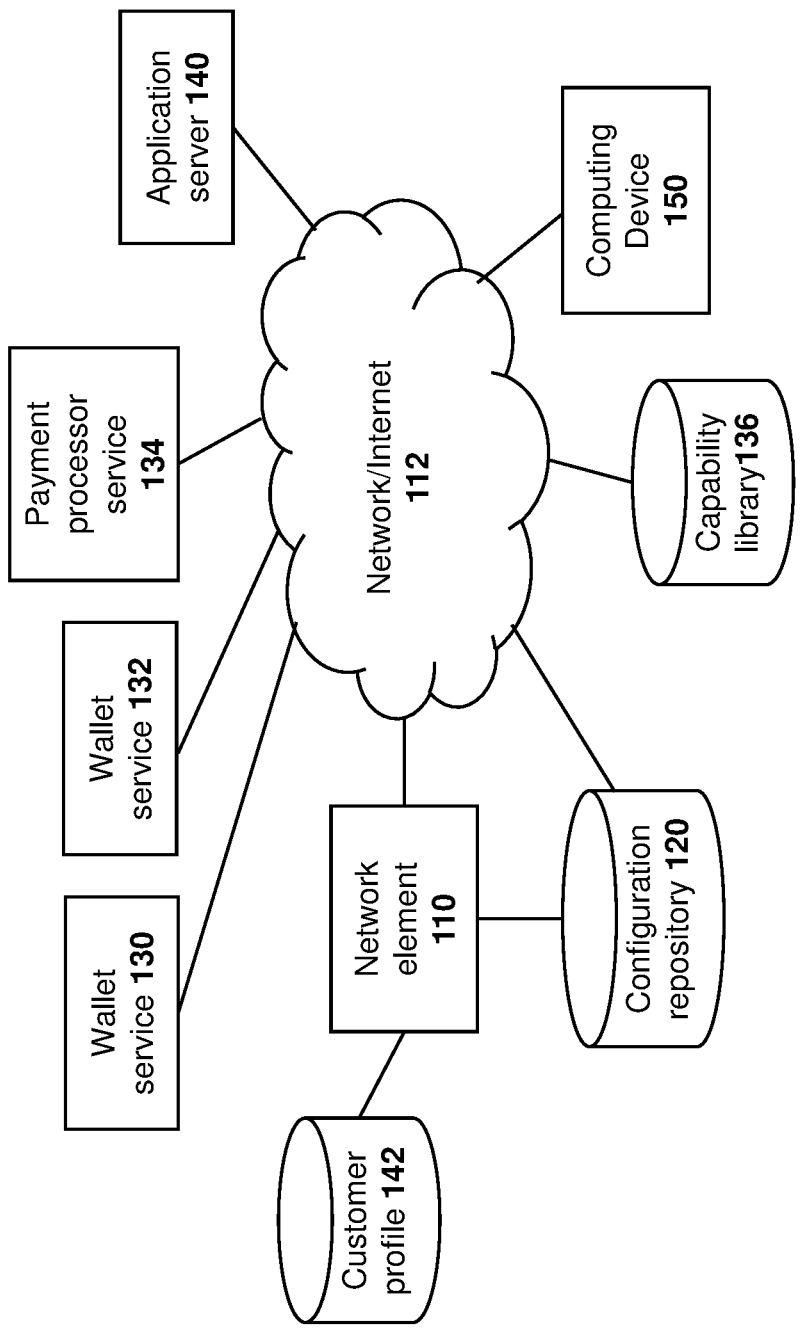
FIG. 1 is a block diagram showing an example computing environment capable of being used with the embodiments of the present disclosure.

The present disclosure will now be described in detail by describing various illustrative, non-limiting embodiments thereof with reference to the accompanying drawings. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

In accordance with the embodiments of the present disclosure, methods and systems to present a user with requests for information needed for the completion of a checkout transaction/operation efficiently.

In particular, a set of required information elements needed for the completion of a transaction is determined, either before a transaction workflow starts, during the transaction workflow, or both. This may be done by reviewing form fields in a configuration file for a checkout operation, for example.

Once the required information elements needed for a completion of a transaction, for example during a checkout operation, are determined, a comparison can be made between information elements available for the customer of the electronic transaction with the required information elements. The information elements available for the customer can be found in various ways. For example, the customer may have an account with the merchant and have information stored at a server associated with the merchant. In another case, the customer may have an account with the provider of the electronic commerce platform, such as a wallet administered by such electronic commerce platform, and may have information stored at a network element associated with that account. In a further case, the customer may have a wallet with a third-party wallet service, and a set of information elements stored in the wallet service can be found. In another case, a payment processor service can provide information elements for a customer. In another case, a capability library associated with a digital wallet service can be queried for information elements. In further embodiments, a configuration for the checkout operation may contain form fields, which may be compared with data from data sources or information libraries. In still further cases, other information libraries or services can be queried. In some embodiments, a plurality of data sources or services can be queried to determine available information elements.

A set of missing information or features that is needed to complete the transaction can then be determined.

Based on the determined missing information, a network element being used for the checkout operation, such as a server, web service, cloud service, among other options, may provide instructions for rendering a user interface on a computing device that can be presented to the customer. Such user interface may be customized for such missing information. For example, the user interface may present only fields for information that is missing in one case. In other cases, the user interface can present all information the merchant needs, but with the fields for which information is available pre-populated. In this case, missing information fields may sometimes be highlighted to provide ease of use and increase potential conversion of the transaction. Other options for rendering the user interface are possible. In each case, the simplified user interface and input requirements cause reduced memory requirements for the display of such information, and reduced network communications by having less information needing to be entered.

Efficiency in the embodiments above is therefore provided by not duplicating collection efforts during the checkout operation.

Each of the above processes is discussed below.

Computing Environment

The embodiments of the present disclosure could be implemented on any computer system. One example operating environment for the present disclosure is provided with reference to FIG. 1. However, the embodiment of FIG. 1 is merely provided as an example, and different computing environments are possible.

In the embodiment of FIG. 1, a network element 110 may be any server or group of servers located within a network. For example, network element 110 may be part of a cloud service such as an e-commerce platform. In other cases, network element 110 can be a server such as a web server associated with the merchant or an e-commerce platform. In other cases, network element 110 may consist of a plurality of servers. In other cases, network element 110 may be a kiosk or point-of-sale terminal associated with a physical store. Other options for network element 110 are possible.

Network element 110 may communicate, through a local or wide area network such as Internet 112, to other computing devices and services. For example, in one case, network element 110 may communicate with a configuration repository 120, either directly or through Internet 112. Configuration repository 120 can store configuration information for checkout operations that can be used by network element 110 to determine information that may be needed by the checkout operation. Information stored by configuration repository 120 can, in some cases, further include user-interface layouts, among other information.

In some cases, configuration repository 120 can include information about products or services for checkout customization. For example, certain goods or services may be configured with standardized checkout configurations, while others may require specialized checkout configurations.

In some embodiments, network element 110 may communicate with a wallet service such as wallet service 130 or wallet service 132. Wallet service 130 or wallet service 132 may, in some cases, belong to an operator of an e-commerce platform and may, as described below, allow for queries to be made on what type of information is available for a particular user or customer. In other cases, wallet service 130 or wallet service 132 may belong to a third-party wallet or service, and a checkout operation may be redirected to such wallet service for a portion of the checkout operation.

In other cases, network element 110 may communicate with a payment processor service 134. For example, such payment processor service may allow the use of a credit card during a checkout operation. Further, payment processor service 134 may store certain information about a consumer or user.

In some cases, where a wallet service 130 or wallet service 132 does not allow a query to be made on the types of user information stored at such wallet, a capability library may optionally be provided. In the embodiment of FIG. 1, capability library 136 may store typical information found within a particular wallet service. Such capability library may, for example, be populated and maintained by an e-commerce platform, by a merchant, or others. The capability library could be queried by network element to find the type of information a wallet typically stores. Thus, for example, capability library 136 may provide information that a specific wallet service typically stores a shipping address, billing address, credit card information, and whether a user is tax exempt. The query by network element 110 would therefore find the types of information available at the wallet service, but the specific information about a particular user would not be available at network element 110.

In still further cases, a hybrid system using a wallet service 130 or wallet service 132, in conjunction with a capability library 136 may be used. For example, wallet service 130 may provide only a subset of the needed information or allow queries only on some of the information stored in the wallet. In this case, the information always in the wallet may be obtained from the capability library 136 and the wallet service 130 queried for the other information. For example, the wallet service 130 may always have some information such as an email address, phone number and physical address since these are required for enrollment with the wallet service, but may not always have a shipping address. The capability library 136 may therefore provide the information known to be in at a wallet service, but the wallet service may need to be queried for information that is optional to determine whether the wallet service has such information.

In still further cases, the capability library may have information on all information that may possibly be found at wallet service 130, but may include flags for those fields that are optional at the wallet service and may therefore need to be queried.

Other options are possible.

Further, the embodiment of FIG. 1 includes an application server 140 which may provide applications to facilitate checkout operations for a merchant. Such application server 140 may therefore provide applications to network element 110 or can run applications which can then communicate with network element 110, regarding various information elements that are needed for a checkout operation.

Further, a customer profile repository 142 may in some cases be stored in the memory of network element 110. In other cases, a customer profile repository may be accessible by network element 110 through Internet 112 or based on other network (e.g., some other wired or wireless network) communications mechanisms. A customer profile repository 142 may provide to network element 110 customer profile information. Therefore, if network element 110 is associated with a particular merchant and such merchant has a customer profile, network element 110 may query such customer profile repository to find information elements available from such customer profile.

Computing device 150 may be any device capable of communicating, for example through network or Internet 112, to network element 110. For example, computing device 150 may be a customer's home or work computer, laptop, mobile device, tablet, smartphone, among other such options. In other cases, computing device 150 may be associated with a physical merchant and be part of an automated checkout, kiosk, point-of-sale terminal, among other options. Further, in some cases, computing device 150 may be a part of network element 110, for example in the case where network element 110 is a kiosk or point-of-sale terminal. A customer may use computing device 150 to perform a transaction and complete a checkout procedure.

The elements in FIG. 1 are merely provided as examples, and in some cases further servers, repositories or services may be part of such computing environment. In other cases, various servers, modules, repositories or services shown in FIG. 1 may be omitted from the computing environment. Therefore, the embodiment of FIG. 1 is merely provided as an illustration of one example computing environment in which the embodiments of the present disclosure may operate.

Network element 110, computing device 150, as well as the various services and repositories of FIG. 1 could be implemented on any type of, or combination of, computing devices. For example, one simplified computing device that may perform the embodiments described herein is provided with regard to FIG. 2.

Figure 2:
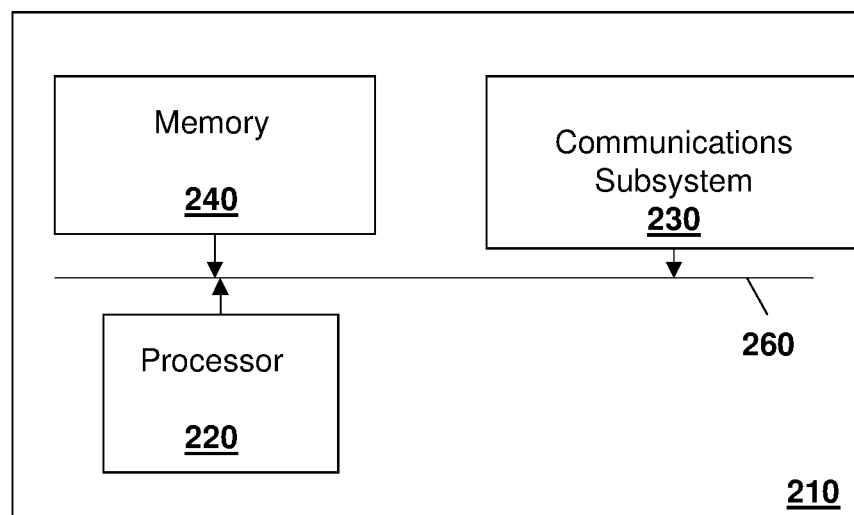
FIG. 2 is a block diagram showing a simplified computing device capable of being used with the embodiments of the present disclosure.

In FIG. 2, computing device 210 includes a processor 220 and a communications subsystem 230, where the processor 220 and communications subsystem 230 cooperate to perform the methods of the embodiments described herein.

The processor 220 is configured to execute programmable logic, which may be stored, along with data, on the computing device 210, and is shown in the example of FIG. 2 as memory 240. The memory 240 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 220 may also be implemented entirely in hardware and not require any stored program to execute logic functions. Memory 240 can store instruction code, which, when executed by processor 220 cause the computing device 210 to perform the embodiments of the present disclosure.

Alternatively, or in addition to the memory 240, the computing device 210 may access data or programmable logic from an external storage medium, for example through the communications subsystem 230.

The communications subsystem 230 allows the computing device 210 to communicate with other devices or network elements.

Communications between the various elements of the computing device 210 may be through an internal bus 260 in one embodiment. However, other forms of communication are possible.

Checkout Configuration

Each merchant enables a unique combination of required information by the commerce platform, third party applications they have installed on their store, or customizations, such as through scripts, theme changes, among other options for their store. This checkout configuration may be done, for example, on a computing device such as network element 110 from FIG. 1.

Figure 3:
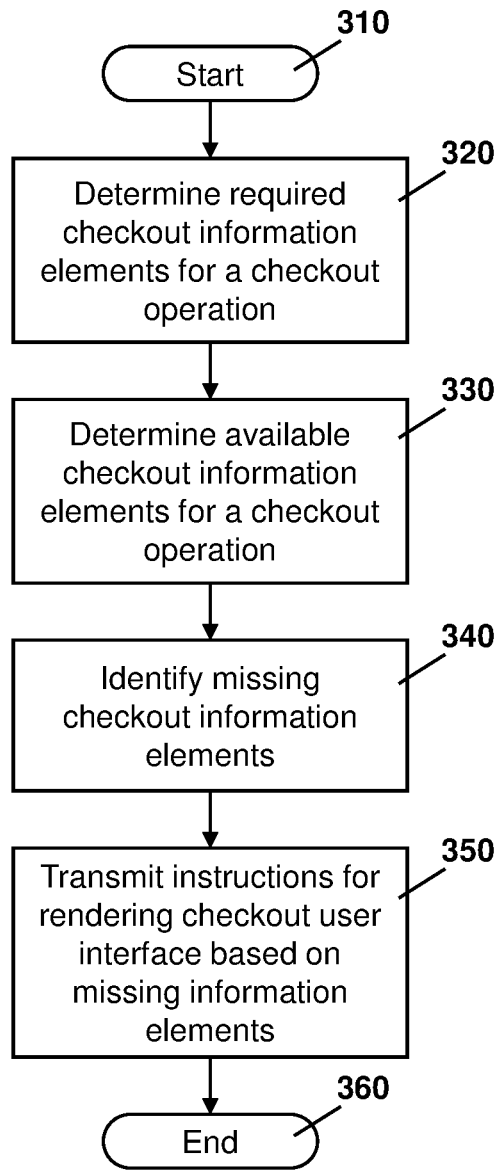
FIG. 3 is a process diagram showing a process for facilitating a checkout operation by comparing required information with available information in order to present a user interface to a customer.

In particular, reference is now made to FIG. 3, which shows a process for facilitating checkout operations. The process of FIG. 3 starts at block 310 and proceeds to block 320 in which a data selection engine on a computing device such as a network element may determine the required checkout information elements needed for a checkout operation.

Each of these pieces of required information may be enabled on a store-wide basis or on a per-product or per-service basis. For example, a tax identification may be needed for all transactions. A tipping option may be needed for a specific service such as hair cutting.

Such required information may be configured prior to an electronic transaction occurring, including for example when establishing the merchant on the electronic commerce platform, or through settings or configuration subsequently.

Figure 4:
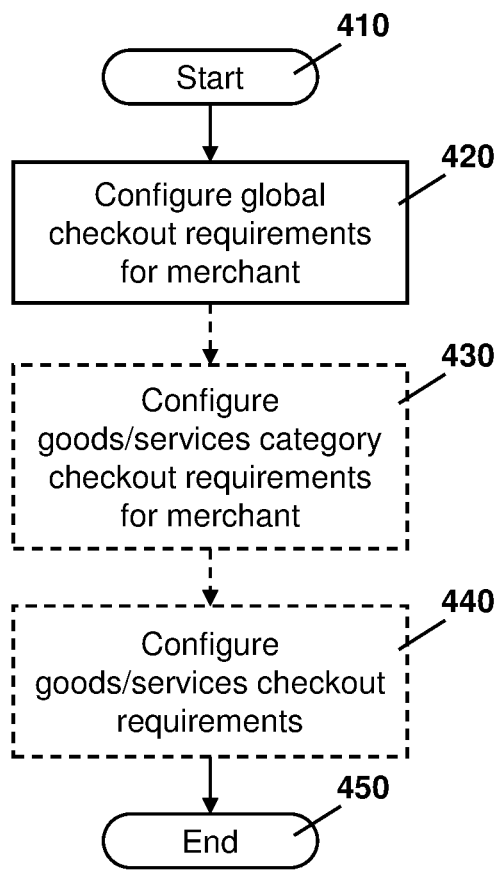
FIG. 4 is a process diagram showing a process used for determining required information elements for a checkout operation.

For example, reference is now made to FIG. 4 which shows a process for configuring checkout requirements for a merchant. In the embodiment of FIG. 4, the process starts at block 410 and proceeds to block 420 in which global checkout requirements for a merchant are configured. For example, based on a location of a business, a type of business, whether products or services are being sold, or other information with regard to the merchant, specific checkout requirements may be needed to complete a checkout operation for such merchant. The configuration at block 420 may be done, for example, at a merchant computing system on enrolling with an e-commerce platform. In other cases, an e-commerce platform may configure such checkout requirements for a merchant computing system when the merchant enrols with the e-commerce platform. In other cases, the global configuration may be done by a web developer or a merchant that is establishing a vendor website. Other options are possible.

From block 420, the process of FIG. 4 may optionally proceed to block 430 in which various goods or services may be placed into various categories for establishing checkout requirements. For example, the merchant, e-commerce platform or other administrator may define categories in which similar goods or services that have similar checkout requirements could be grouped together. For example, at a spa, various services such as a manicure, pedicure, or massage could be added to a category in which a tip option should be provided to a customer during a checkout operation. Other items such as a line of scented candles may be considered products and utilize a standard checkout model that does not provide a tip option.

In a still further optional process, the process of FIG. 4 may proceed from block 430 to block 440 in which individual goods or services may be configured with checkout requirements. For example, as a merchant adds a good or service to their online store, such addition may specify checkout requirements for such good or service.

Based on the information provided at blocks 420, 430 and/or 440, a network element may populate a repository, list or other storage with required information elements for a particular transaction. The list can have standard elements required for every transaction. The list could further have conditional elements that may be based on the merchant, products or services in a customer's shopping cart, customer profile for a particular customer, among other options. The list or repository can be used for configuration of the checkout operation subsequently, as described below.

The process then proceeds to block 450 and ends.

Therefore, in addition to pre-configured, store-wide information needed, in other cases, needed information may be determined at the time of the electronic transaction. The goods and/or services in a customer's shopping cart may be compared with rules for such goods and/or services. For example, in the case of a merchant offering dog boarding services through their e-commerce store, the e-commerce store may need to collect information such as, for example, information regarding the name and contact information for an emergency veterinarian and/or a threshold limit of costs that can be incurred by such veterinarian before explicit approval must be obtained, and/or other information specific to the circumstances of dog boarding. However, the e-commerce store may offer other goods or services that do not give rise to a need to collect such information and/or need to collect different information. For example, the requirement for such information would not exist if the customer merely has dog treats in her shopping cart. Therefore, in this case, only the per-product features related to products in the cart are considered to be required, in addition to the store-wide pre-configured features.

For example, referring to FIG. 5, one example user interface that may be provided to a merchant to add a product or service to their online store is shown. User interface 500 includes various information about the product or service being added. Such information may include a title, description, media associated with the good or service, pricing, identifiers for the good or service, if the item being added is a product, the quantity of such product available, among other options. The fields shown in FIG. 5 are merely examples, and other information about the product or service may be required when adding the product or service to the online store, such as colour options, size options, or other such information. The embodiment of FIG. 5 is therefore not limited to any particular product or service or user interface associated with adding such product or service.

In one case, a further field 510 may be added to the user interface indicating a checkout category for such good or service. In the example of FIG. 5, the category has a pulldown menu 512 which may have a standard configuration for checkout for a good or service. However other options may be configured for the e-commerce store, and may include a tip option to allow the good or service to require the consumer be presented with a checkout operation user interface having an option to tip.

In other cases, checkout operation for a clothing retailer may configure the user interface to reflect that in certain jurisdictions children's clothing has no tax while adult clothing does, and therefore the check out option may be a no tax option for a particular jurisdiction.

Categories can be defined during on-boarding of merchants to an e-commerce platform in some cases. In other cases, a merchant, administrator, or other authorized user can define the categories, either at the initial setup of the merchant or subsequent to the initial setup.

Further, in the example of FIG. 5, a custom checkout option 514 is provided. The custom checkout option may provide a further user interface in which the merchant may specify or add additional fields that are needed for a particular good or service. For example, in the case of a merchant offering dog boarding through their e-commerce store, the information needed by the computer system for the checkout operation may include the name of the veterinarian, the address of the veterinarian and the emergency contact for such veterinarian. Other examples of custom fields are possible, and the embodiment of FIG. 5 is not limited to any particular custom fields being added. Further, custom fields may allow for the standard requirements for checkout to be deselected if such standard requirements are not needed for a particular good or service.

While the embodiment of FIG. 5 shows a user interface which may need to be configured with each good or service added to an online store, in other cases, the information could be added using other techniques. For example, scripts, batch processing, database parsing or other techniques could be used to find required information elements for checkout.

In still further embodiments, a computer system may use one or more applications to facilitate checkout operations. Such applications may, for example, be stored at the application server 140 from the embodiment of FIG. 1. Such application used for checkout operations may register with the network element and provide details on required information elements during a checkout operation. For example, reference is now made to FIG. 6.

Figure 6:
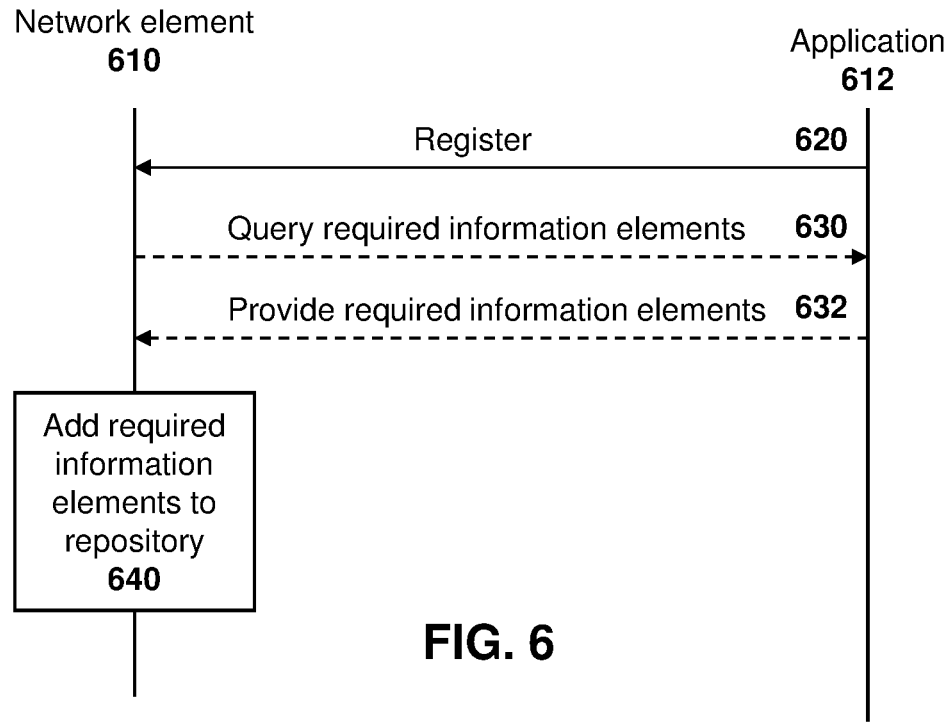
FIG. 6 is a process flow diagram showing an application registration with a network element including the provision of required information elements to the network element.

In the embodiment of FIG. 6, network element 610 communicates with an application 612. The application 612 may be an application used to facilitate or customize a checkout operation. In this case, application 612 may register with network element 610, as shown with message 620.

In some cases, the registration message 620 further includes a list of required information elements. However, if the registration message 620 does not include such list, then the network element 610 may query what required information elements the application 610 has, as shown with message 630.

In response to receiving message 630, the application 612 may provide a required information elements list to the network element 610, as shown with message 632.

As will be appreciated by those in the art, if the registration message 620 includes the required information elements, and then messages 630 and 632 are optional.

Once network element 610 has a list of required information elements for a transaction for a particular merchant, then at block 640 a data selection engine on the network element 610 may add the required information elements to the list or repository of required information elements.

The embodiments of FIGS. 4, 5 and 6 provide examples of ways that a network element may obtain required information elements for a checkout process. The embodiments of these figures are provided merely for illustration purposes on how required information elements may be determined. Therefore, in some cases, a particular merchant may use only one of the embodiments of FIG. 4, 5 or 6, or may use a combination of two or more of such embodiments.

Figure 7:
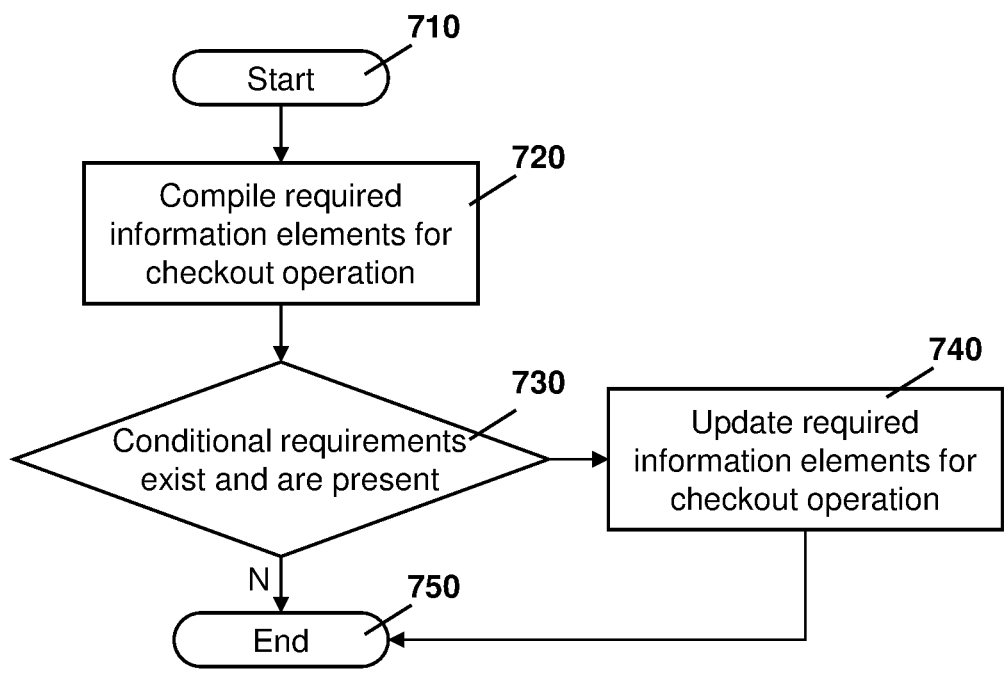
FIG. 7 is a process diagram showing a process of compiling a list of required information elements needed for a specific checkout operation.

When configuring a checkout operation, in some cases the required information elements for such checkout operation may be static and uniform for the e-commerce store. However, in other cases, the checkout operation may have different required information elements based on one or more of a merchant profile; goods or services that form part of the e-commerce transaction; and/or a customer profile for the customer performing the electronic commerce transactions. Reference is now made to FIG. 7.

In the embodiment of FIG. 7, the process starts at block 710 and proceeds to block 720 in which a data selection engine at a network element may compile a list of the required information elements for a checkout operation. The compiling at block 720 may involve obtaining the required information elements from a repository of required information elements, where such repository was created using one or more of the embodiments of FIG. 4, 5 or 6.

From block 720, the process proceeds to block 730 in which a check is made to determine whether any conditional requirements exist and are present in the list of required information elements. For example, as provided above, one option may be to add a tipping feature to a checkout operation if a particular service is part of a consumer's shopping cart. Therefore, the repository of required information elements may have an indication that a particular information element is required only if a particular good or service, or class of goods or services, is present within a shopping cart.

In some cases, the conditions may not be based on the goods or services in the electronic commerce transaction, but rather may relate to a particular customer profile. For example, if a customer has an account with either the merchant or the electronic commerce platform, this information may also be used to find needed information. In one case, based on a value of past transactions, for example, a buyer may prefer to proceed through a full checkout process (e.g., avoiding 1-click ordering) for expensive items above a threshold value. In other cases, the customer checkout may be based on whether or not the e-commerce store is known to this buyer, for example when a buyer has previously made one or more purchases at this store, the required information elements needed from the customer can be customized.

In still further cases, the required information elements may be based on merchant characteristics. For example, the e-commerce store may have a presence in two countries and based on the country that the transaction is occurring in, the various information elements may be required.

Other examples are possible.

If the check at block 730 determines that the conditional requirements exist and are present in the list of required information elements, the process proceeds to block 740 in which the list of required information elements is updated based on the conditions and whether such conditions are satisfied or not. This may involve the addition of required information elements to the list of required information elements in some cases. In other cases, it may involve the removal of required information elements from the list of required information elements.

From block 730 if no conditional requirements are present, or from block 740, the process proceeds to block 750 and ends.

Therefore, based on the static and/or dynamic analysis by the data selection engine of a network element, a set of required information elements needed to complete the electronic transaction can be determined at a computer system.

Determining Information Available

Referring again to the embodiment of FIG. 3, once the required checkout information elements for a checkout operation have been determined, the process proceeds from block 320 to block 330 in which available checkout information elements for a checkout operation may be determined. In particular, during an electronic transaction, available information about a customer may be found, for example using an information selection engine at a network element. This may be done from one or more data sources.

Figure 8:
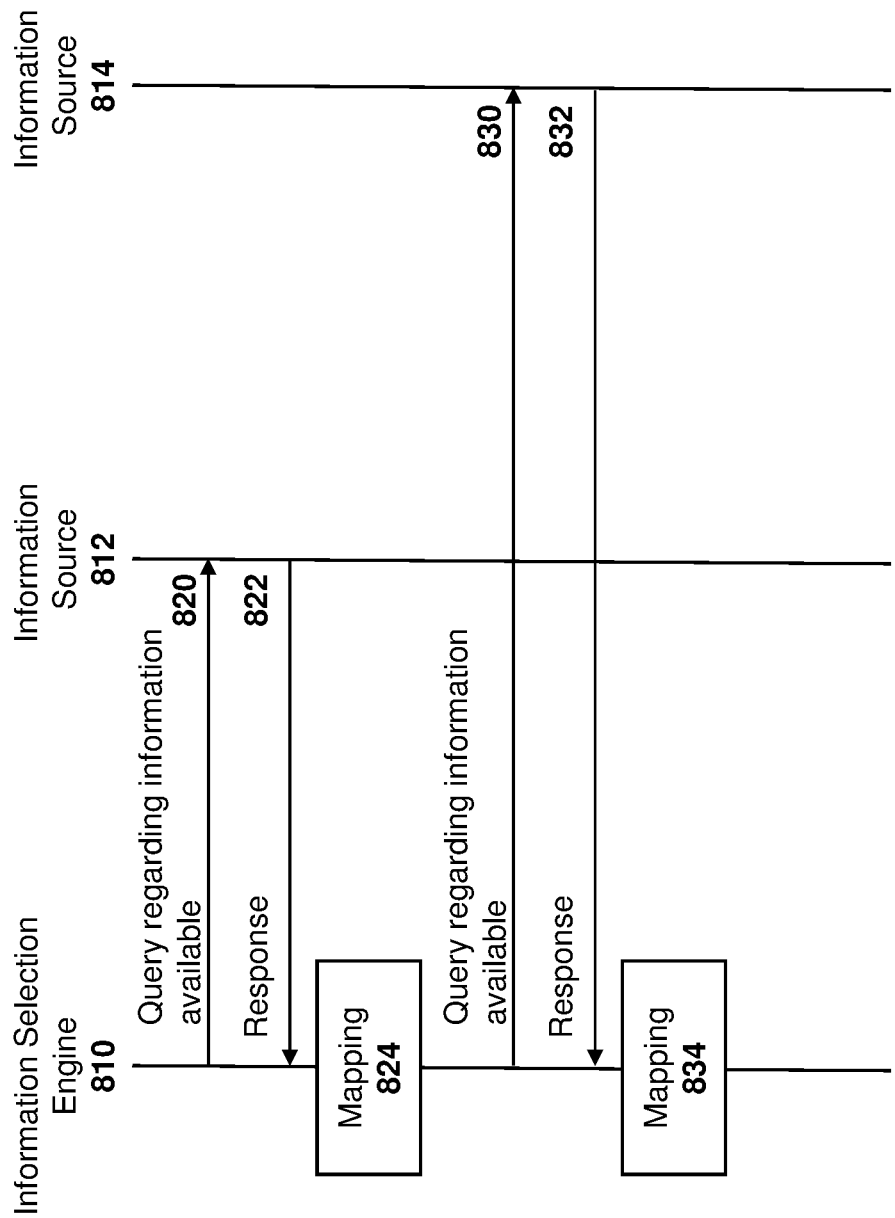
FIG. 8 is a dataflow diagram showing a process for an information selection engine to obtain available checkout information elements for a customer.

Reference is now made to FIG. 8 in which an information selection engine 810 may communicate with one or more information sources. In the example of FIG. 8, two information sources, namely information source 812 and information source 814, are shown. The example of two information sources is however only provided for illustration purposes and in other cases the information selection engine 810 may only query a single information source. In other cases, the information selection engine 810 may query a plurality of information sources in order to obtain information elements for information about a customer.

Information sources 812 and 814 may be on the same computing device as the information selection engine, or may be accessible through a wired or wireless connection, and may be administered by the same party as the information selection engine or may be administered by a third party.

Specifically, in the example of FIG. 8, information selection engine 810 sends a query regarding information available, shown as message 820, to information source 812.

In some cases, message 820 may be a poll, and may consist of the plurality of messages. For example, message 820 may ask if a particular piece of information is available and information source 812 may confirm or deny whether such information element is available in a response 822.

In other cases, message 820 may be a more sophisticated message and may depend on an Application Program Interface (API) at information source 812.

In some cases, the query at message 820 may simply ask whether information fields are available, without obtaining such information. For example, if the information source is a digital wallet service, for privacy reasons the digital wallet service may not return information about a particular customer, but may be willing to provide information with regard to whether or not certain types of information are available at the digital wallet service.

In other cases, the query at message 820 may ask whether an information field is available and ask for the return of any information contained within the information field at the information source 812.

For example, in a first case the customer may have an account with a merchant computer system and may have information stored with such merchant. For example, in the case of a merchant offering dog boarding services through their e-commerce store, the customer may have previously boarded the dog with the merchant, and information about the customer's address and emergency veterinarian may be stored by the merchant. At the start of, or during, a checkout operation or during the e-commerce transaction, the customer may be prompted to login and an information selection engine 810 may query a database or repository comprising information source 812 and note the information stored with regards to the customer's profile. In this case, a response 822 from information source 812 may include information regarding the particular customer.

In another case, the customer may have an account with the electronic commerce platform the merchant is using. For example, the merchant may use a Shopify™ electronic commerce platform and the customer may be registered with a Shop Pay™ wallet and accelerated checkout mechanism. In this case, the information selection engine 810 will know the information elements for information stored in information source 812 regarding the customer.

In another case, the customer may use a third-party wallet (e.g., a wallet not associated with/offered by an e-commerce platform). Such wallets are used for a number of reasons, including providing a trusted payment transaction across sites, thereby providing assurances that user data should be kept safe, as well as the option for accelerated checkout in some situations. In this case, each wallet may store certain information about a customer. This information may be found by the information selection engine 810 in several ways.

In some cases, the wallet may have an API that would allow the information selection engine 810 to query the wallet (information source 812) about the type of information stored by the wallet. In some situations, this may be a generic query about the fields stored by the wallet. In other situations, information about the populated fields for a specific customer can be requested. In both cases, generic information fields rather than specific information may be provided back to information selection engine 810 to ensure privacy of the consumer.

Such API query may involve a network element associated with the information selection engine 810 making a network call to a remote server associated with the wallet service utilizing the functions and procedures of the API to obtain the fields stored at the wallet service for the customer profile.

In other cases, non-sensitive information for a specific customer may be requested. In this case the functions and procedures of the API at the remote server may be used to obtain this non-sensitive information using network message exchanges.

If the wallet does not have an API or allow a query, or to avoid query latency, a capability library such as capability library 136 from the embodiment of FIG. 1 can be built and maintained by the electronic commerce platform or merchant. In other cases, if the wallet has a subset of information fields that are optional, to improve network efficient network calls to the remote server associated with the wallet service may be limited to the optional fields, and the remaining information may be obtained from the capability library.

Such capability library may store data about information fields that may be available from various third-party wallets, including, for example, what information fields are typically found in a wallet of a given type.

In some cases, the information stored in a particular wallet may be found prior to user selection of a wallet. In this case, a preference order for wallets may be presented to the customer.

In other situations, the information stored in a particular wallet can be determined once the wallet is selected, and prior to the user being directed to the wallet to complete the transaction.

In other situations, the customer may be re-directed to the wallet and then return to the merchant page. In this case, certain information may be available to the merchant from the wallet.

Other options are possible.

Once one or more responses 822 are received at information selection engine 810, in some cases a mapping or translation function 824 may be needed to map or translate the response to the required information elements as determined in the embodiments of FIGS. 3 to 7. Specifically, an information source 812 may provide information in a variety of ways which may not directly correspond with the fields required for a checkout operation. For example, information source 812 may provide a complete street address including the name of the city and postal or ZIP code, whereas the checkout operation requires each of the elements of the address to be in a separate field. In this case, the mapping function 824 may parse the response 822 to correlate the information received with the required information elements for the checkout operation.

In other cases, response 822 may include the information itself and not a field name. In this regard, a translation function at block 824 could be used to correlate the information received with the fields required for the checkout operation. In other cases, information source 812 may provide information in a field that may not directly match the required information elements for the checkout operation and a mapping function at block 824 may determine whether the field is sufficient to correspond to a required information elements for the checkout operation. Other options are possible.

Mapping function block 824 is however optional and in some cases may not be required depending on the information source 812.

As indicated above, while a single query 820 and a single response 822 are shown in the embodiment of FIG. 8, in some cases a plurality of queries and responses between information selection engine 810 and information source 812 are possible.

Further, in some cases, due to privacy, the information source 812 may provide a response indicating that it has certain information at response 822. If the merchant requires such information to complete the checkout operation, such information may be provided subsequently in the checkout operation once the customer has been redirected to the information source and confirmed their credentials. Other options are possible.

Further, in some cases where information is pulled from information source 812, if the information is then used to pre-populate fields in the checkout operation and the pre-populated information is changed, the updated information may in some cases be saved back to information source 812 to update such information source.

Similarly, information selection engine 810 may send a query regarding information available in message 830 to information source 814 and receive a response 832 back. If needed, a mapping function 834 may map the information elements within the response 832 to the required information elements for the checkout transaction.

Again, message 830 and response 832 are shown as a single message and response in the example of FIG. 8, but could comprise a plurality of messages or queries and responses.

If more information sources are available, information selection engine 810 may similarly query such information sources.

Once all of the information sources are queried, information selection engine 810 may compile the determined available information elements. Therefore, using one or multiple of the techniques above, an information selection engine may determine available information about a customer.

Identifying Missing Information Elements

Referring again to FIG. 3, once the available checkout information elements for a checkout operation have been determined at block 330, the process proceeds to block 340 in which the network element may identify missing checkout information elements.

In this case, the process at block 340 may include a comparison of the required checkout information elements and the available checkout information elements and an identification of the missing checkout information elements when comparing the two lists.

In some cases, if a mapping function has not occurred, then the identification of the missing checkout information elements may require some mapping or parsing or translation in order to allow for the comparison of the required and available checkout information elements.

Therefore, at block 340 a delta between the required and available information elements can be identified.

Rendering a Checkout User Interface

Once the missing checkout information elements have been identified at block 340, the process of FIG. 3 proceeds from block 340 to block 350 in which instructions may be transmitted from the network element to a computing device for a user in order for the computing device of the user to render a checkout user interface based on the missing information elements.

Figure 9:
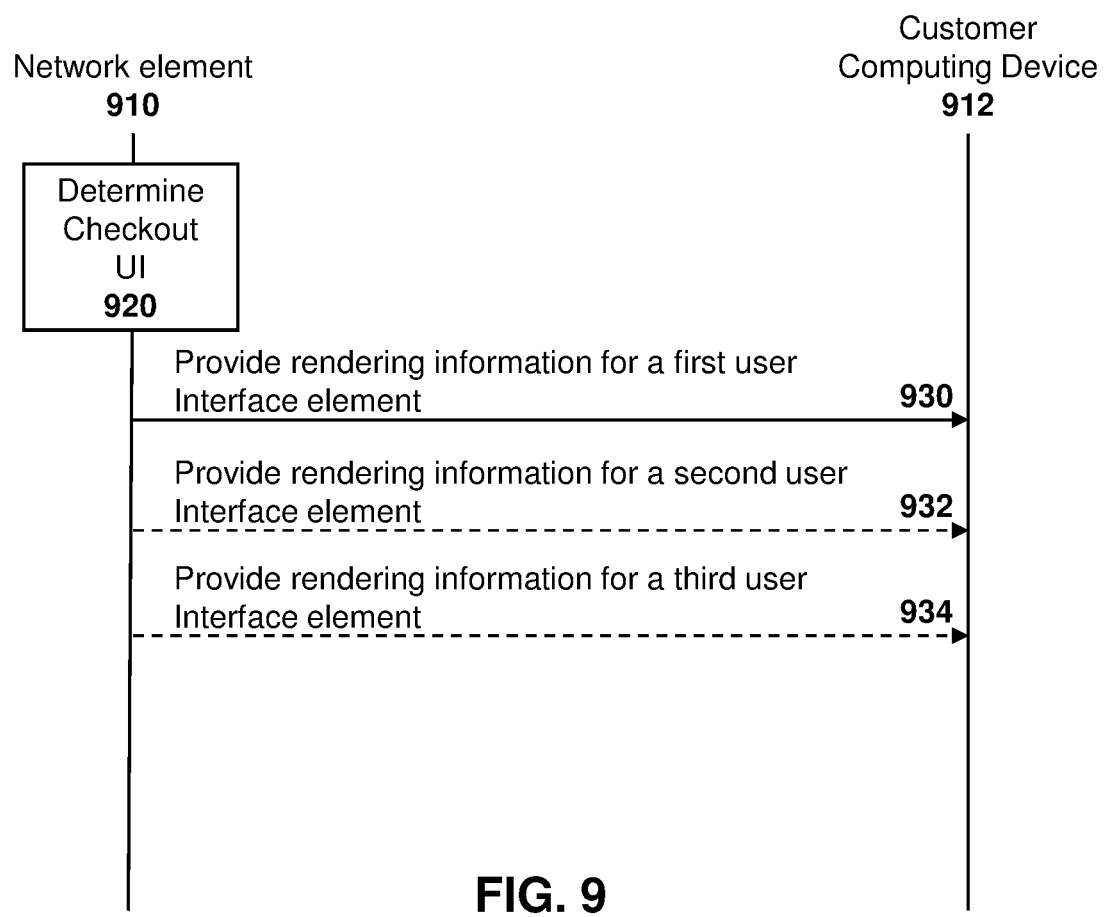
FIG. 9 is a dataflow diagram showing a network element transmitting rendering information to a computing device for displaying a user interface for a checkout operation.

In particular, reference is now made to FIG. 9. In the embodiment of FIG. 9, a network element 910 may communicate with a customer computing device 912. Customer computing device 912 may be any device a customer is using for the e-commerce transaction and may be computing device 150 from the embodiment of FIG. 1.

Based on the missing information elements identified at block 340 of FIG. 3, the network element 910 may determine a checkout user interface at block 920 in order to capture the missing information elements during the checkout operation and then provide a rendering information transmission for a first user interface (UI) element, as shown by message 930. This configuration of the user interface provides network and computing device efficiency by ensuring computing resources are not wasted duplicating data collection and verification tasks. Specifically, by providing a user interface in which only a subset of the information elements needed for a checkout operation is presented, or in which fields are pre-populated, less time, less memory, and reduced network communication messages or message sizes are needed for the data collection. Specifically, cases where the same information is provided twice during a checkout operation are avoided. Information that is already known for the checkout operation does not need to be passed across a network. Information that is already known also does not need to be re-input from a computing system and passed across the network to a network element, to be verified and possibly cause an error to be flagged back to the consumer's computing device.

The first UI element may be any UI element that captures some or all of the missing information elements.

In some cases, there are no missing information elements. In this case, the customer may be presented with a confirmation screen to confirm the transaction without requiring further details. The transmission of message 930 may therefore be instructions to render such confirmation screen.

In other cases, a particular checkout may be selected based on the needed and missing information. As used herein, a checkout may be a set of screens providing information from a customer to complete the transaction and create a contract between the customer and merchant. For example, a series of checkouts may be approved for a merchant to use and the determination at block 920 may compare these approved checkouts with the missing information elements and use one that captures such missing information elements. Therefore, the determination at block 920 may be a selection of one checkout from a plurality of checkouts.

In other cases, a user interface may be built to present fields to the customer of only the missing information. This may be done at block 920 of FIG. 9. Thus, if a tip option should be presented to a user, this may be done prior to, or after, being redirected to a wallet that does not support a tipping option.

In further cases, the required fields of a user interface that may be a generic, un-customized user interface may be populated with available information, and fields left blank for needed information. Such fields may be, in some cases, highlighted or sorted to be presented together.

In other cases, pop-ups may be used to obtain the missing, required, information. This may lead to a plurality of user interface elements being provided to the user and is shown in the embodiment of FIG. 9 as messages 932 and 934. While the embodiment of FIG. 9 only shows three messages, in some cases, one message is sufficient and in other cases two, three or more messages may be provided to the computing device 912.

Other options for the design and implementation of a user interface to obtain missing, required information are possible, and the present disclosure is not limited to any particular user interface.

The request for the missing information may be done prior to a user being directed to a payment screen, after returning from a payment screen, or both. For example, if certain information is expected to be provided by a wallet but is not provided, this missing information can be requested subsequently without requiring a user to re-enter existing information. This can be done by sending message 930, for example with a pop up asking for the missing information.

On receiving any of messages 930, 932 or 932, computing device 912 may therefore render the user interface and provide information that is input into such user interface back to network element 910.

Therefore, the embodiments described herein allow for the completion of a checkout operation by facilitating information gathering for a customer while meeting the needs for the e-commerce transaction. This can lead to more efficient computing systems. Conveniently, such a checkout operation may, in at least some embodiments, also have the advantage of avoiding overwhelming the user are provided. As a result, this may lead to reduced customer frustration with the checkout process and higher conversion on checkout. Conversion, as used herein, means the completion of a transaction started by a user, rather than the user abandoning the transaction, such as by leaving items in a shopping cart and not finishing the transaction. For example, a high percentage of users, faced with filling out forms on a checkout, abandon the transaction, leading to lost sales for the merchant.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A method performed by an e-commerce platform for a merchant of a plurality of merchants during a checkout operation between a customer computing device and a network element, the e-commerce platform including a memory, the network element and an information selection engine, wherein the network element includes a processor, the method comprising:
   storing, by the processor, for each of the plurality of merchants, a merchant profile in the memory, wherein each merchant profile includes a plurality of fields for a checkout user interface and rules associated with the checkout user interface;
   presenting, by the processor, an online store interface of the merchant on a customer computing device;
   receiving, by the processor, a checkout operation for one or more items from the customer computing device via the online store interface;
   querying, by the information selection engine, a digital wallet on the customer computing device for wallet information;
   receiving, by the information selection engine, the wallet information from the digital wallet;
   selecting, by the processor, and for the merchant, the rules and a subset of the plurality of fields in the merchant profile based on the one or more items received from the customer computing device and the received wallet information, the subset of the plurality of fields including a missing field corresponding to a missing element of the checkout user interface;
   generating, by the processor, rendering instructions based on the one or more items, the selected subset of the plurality of fields including the missing field and the selected rules of the merchant profile;
   transmitting, by the processor, the rendering instructions of the modified checkout user interface to the customer computing device; and
   receiving, by the processor, information from the customer computing device in the selected subset of the plurality of fields including the missing field corresponding to the missing element of the modified checkout user interface.

2. The method of claim 1, wherein an online service associated with the digital wallet of the customer computing device is identified in the checkout operation.

3. The method of claim 2, wherein the online service comprises at least one of: a payment processor service associated with the digital wallet; or a capability library associated with the digital wallet.

4. The method of claim 1, further comprising determining, by the information selection engine, a set of checkout information available based on querying an online service associated with the digital wallet.

5. The method of claim 1, wherein a set of required fields is determined based on a product or service of the checkout operation.

6. The method of claim 1, wherein the checkout user interface is based on the rules of the merchant profile for checkout operations with the online store interface of an online store of the merchant.

7. The method of claim 1, wherein the rules of the merchant profile include a service configured for checkout operations at the online store.

8. The method of claim 1, wherein the rendering instructions for the rendering the modified checkout user interface is based on a missing checkout information element corresponding to the missing field.

9. The method of claim 1, wherein the processor transmits the rendering instructions of the checkout user interface for displaying a first set of one or more missing checkout information fields and at least one modified checkout user interface for displaying at least one further missing field.

10. A system comprising:
   e-commerce platform comprising a memory and a network element, wherein the network element comprises an information selection engine;
   the network element configured to:
      store, for each of a plurality of merchants, a merchant profile in the memory, wherein each merchant profile includes a plurality of fields for a checkout user interface and rules associated with the checkout user interface;
      present an online store interface of a merchant of the plurality of merchants on a customer computing device; and
      receive a checkout operation for one or more items from the customer computing device via the online store interface;
   the information selection engine configured to:
      query a digital wallet on the customer computing device for wallet information; and
      receive the wallet information from the digital wallet;
   the network element further configured to:
      select the rules and a subset of the plurality of fields in the merchant profile based on the one or more items received from the customer computing device and the received wallet information, the subset of the plurality of fields including a missing field corresponding to a missing element of the checkout user interface;

generate rendering instructions based on the one or more items, the selected subset of the plurality of fields including the missing field and the selected rules of the merchant profile;

transmit the rendering instructions of the modified checkout user interface to the customer computing device; and, receiving from the customer computing device in the selected subset of the plurality of fields including the missing field corresponding to the missing element of the modified checkout user interface.

11. The system of claim 10, wherein an online service associated with the digital wallet of the customer computing device is identified in the checkout operation.

12. The system of claim 11, wherein the service comprises at least one of: a payment processor service associated with the digital wallet; or a capability library associated with the digital wallet.

13. The system of claim 10, wherein the information selection engine of the network element is configured to determine a set of checkout information available using the query of the digital wallet.

14. The system of claim 10, wherein the checkout user interface is based on the rules of the merchant profile for checkout operations with the online store interface of an online store of the merchant.

15. The system of claim 10, wherein the rules of the merchant profile include a service configured for checkout operations at the online store.

16. The system of claim 10, wherein the rendering instructions are configured for rendering the modified checkout user interface based on a missing checkout information element corresponding to the missing field.

17. The system of claim 10, wherein the rendering instructions are configured for rendering the checkout user interface for a first set of one or more missing fields and at least one modified checkout user interface for at least one further missing field.

18. A non-transitory machine-readable storing instruction code that when executed by a processor of a network element of an e-commerce platform of a merchant of a plurality of merchants, comprising a memory, wherein the network element further comprises an information selection engine, causes the processor to perform the steps of:

storing, for each of the plurality of merchants, a merchant profile in the memory, wherein each merchant profile includes a plurality of fields for a checkout user interface and rules associated with the checkout user interface;

presenting, an online store interface of the merchant on a customer computing device;

receiving a checkout operation for one or more items from the customer computing device via the online store interface;

querying, via the information selection engine, a digital wallet on the customer computing device for wallet information;

receiving, via the information selection engine, the wallet information from the digital wallet;

selecting the rules and a subset of the plurality of fields in the merchant profile based on the one or more items received from the customer computing device and the received wallet information, the subset of the plurality of fields including a missing field corresponding to a missing element of the checkout user interface;

generating rendering instructions based on the one or more items, the selected subset of the plurality of fields including the missing field and the selected rules of the merchant profile;

transmitting the rendering instructions of the modified checkout user interface to the customer computing device; and receiving from the customer computing device in the selected subset of the plurality of fields including the missing field corresponding to the missing element of the modified checkout user interface.

* * * * *